United States Patent [19]

Vetter

[11] 4,162,884
[45] Jul. 31, 1979

[54] APPARATUS FOR SHAPING PLASTICS FOILS

[75] Inventor: Arthur Vetter, Wolfertschwenden, Fed. Rep. of Germany

[73] Assignee: Multivac Sepp Haggenmuller KG, Wolfertschwenden, Fed. Rep. of Germany

[21] Appl. No.: 803,103

[22] Filed: Jun. 3, 1977

[30] Foreign Application Priority Data

Dec. 10, 1976 [DE] Fed. Rep. of Germany ....... 2638759

[51] Int. Cl.² .......................................... B29C 17/04
[52] U.S. Cl. ..................................... 425/388; 264/535
[58] Field of Search ..................... 425/388; 264/92, 90

[56] References Cited

U.S. PATENT DOCUMENTS

| 3,114,934 | 12/1963 | Gerletz | 425/388 |
| 3,159,695 | 12/1964 | Behringer | 264/92 X |
| 3,488,411 | 1/1970 | Goldman | 264/92 X |
| 3,488,414 | 1/1970 | Naples | 264/92 |
| 3,516,122 | 6/1970 | Schwartz | 425/388 X |
| 3,753,830 | 8/1973 | Cruckshank et al. | 428/388 X |
| 3,920,371 | 11/1975 | Faller | 425/388 |
| 3,923,948 | 12/1975 | Jackson et al. | 264/321 X |
| 3,958,394 | 5/1976 | Mahoffy et al. | 425/388 X |
| 3,962,392 | 6/1976 | Conner, Jr. | 425/388 X |
| 4,016,231 | 4/1977 | Hawkins | 264/92 |

Primary Examiner—Robert L. Spicer, Jr.
Attorney, Agent, or Firm—Pollock, Vande Sande & Priddy

[57] ABSTRACT

Plastics foil is shaped in a deep drawing apparatus by being placed in a mould, while the foil is below its deformation temperature, having heated wall surfaces and by applying a pressure differential to the foil so that it progressively stretches and contacts the mould wall. The progressive heating and stretching ensures that the corners of the moulded article are not thinner than the remaining portions of the moulded article, thus reducing the amount of plastics material necessary for an article of given strength.

11 Claims, 4 Drawing Figures

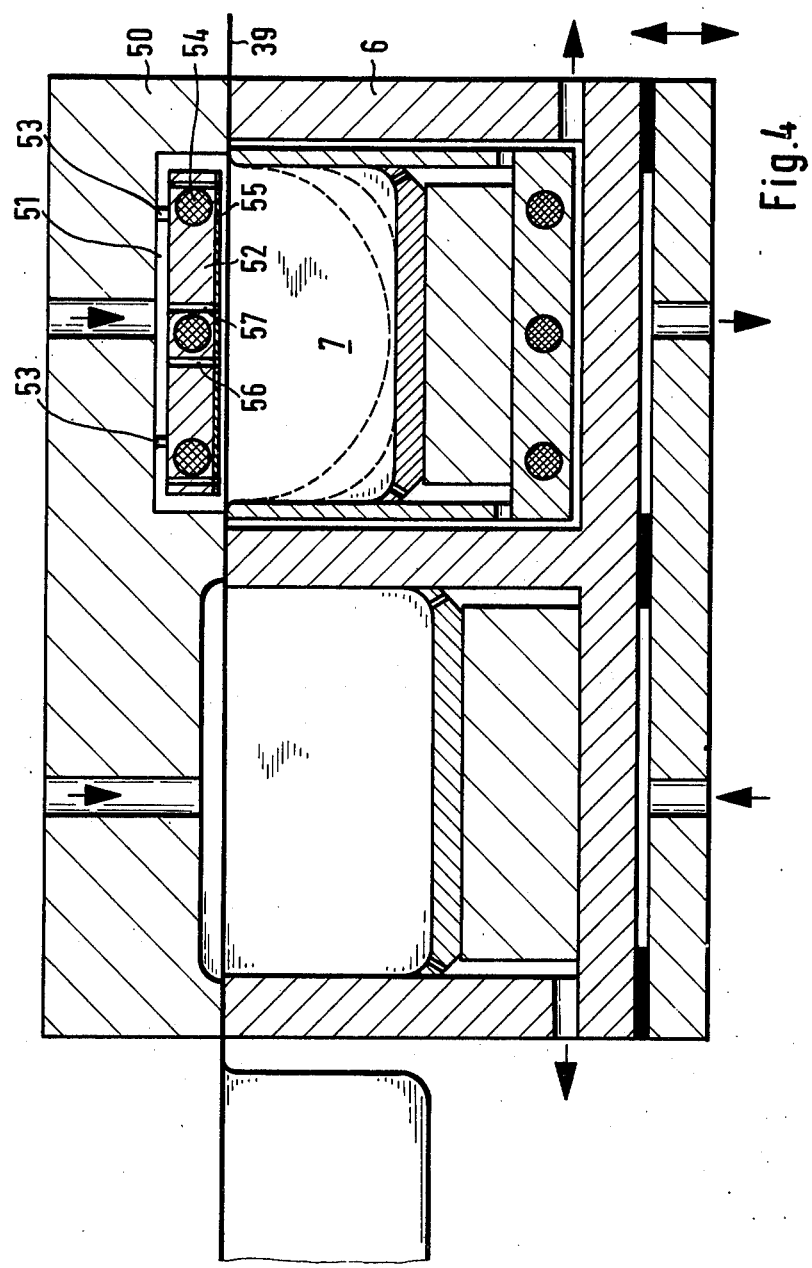

APPARATUS FOR SHAPING PLASTICS FOILS

CROSS REFERENCE TO RELATED APPLICATION

A copending application Ser. No. 803,104 directed to a method of shaping plastics was filed June 3, 1977 by the same inventor as the present application, was assigned to the same assignee as the present invention and is incorporated by reference thereto.

BACKGROUND OF THE INVENTION

The present invention relates to an apparatus for producing articles by shaping thermoplastic plastics foil.

Shaping of plastics foils often takes place when packaging with thermoplastic foils. For example, the foil may first be heated in a deep drawing tool by heat transfer from a heating plate. Subsequently, the foil is sucked by a fluid pressure difference into a mould positioned opposite the heating surface, with the mould not being pre-heated. The heated foil is stretched and stabilizes its shape after contacting the cold walls of the shaping mould. The moulding of the material begins at the moment the foil is sucked into the pre-heated mould and ends for the respective parts of the foil as they are cooled by contacting the unheated mould. As the deep-drawn corners and edges of any particular shape are last to contact the walls of the mould, these portions are stretched the most and therefore have the smallest wall thickness of the newly formed deep-drawn container. One example of a container shaped as above stated is shown in FIG. 2 of the accompanying drawings.

From West German Offenlegungsschrift No. 16 04 444 a method is known in which, for the shaping of polypropylene or polyvinyl chloride foils, individual zones of the foil are pre-heated to different degrees. First the foil edge which normally is used for clamping is heated and then the remaining portion is heated by contacting a pre-heated surface. Subsequently the shaping operation itself takes place, with the edge contributing to the extension, with the total extension being somewhat less as a result. Here, too, the problem arises in that the corners and edges of the container are subject to the largest extension forces resulting in the smallest wall thickness.

OBJECTS AND SUMMARY OF THE INVENTION

It is a primary object of the invention to provide an entirely novel apparatus for producing articles by shaping thermoplastic plastics foils.

It is a further object of the invention to provide an apparatus for shaping plastics foil into articles of desired shape including corners and edges having a wall thickness at least the same as the wall thickness of the remaining parts of the article.

It is a still further object of the invention to provide an apparatus for shaping thermoplastic plastics foil into articles of desired shape and strength while substantially reducing the amount of plastics material necessary for the production of such article to reduce the cost thereof.

Accordin to the present invention, there is provided an apparatus for shaping thermoplastic plastics foil, including a mould having a mould cavity and means for drawing the foil into the mould, wherein the surface of the mould contacts the foil and functions to heat the foil for moulding thereof. drawn is arranged so as, in use, to be heated during moulding so as to heat the foil.

With the apparatus, the heating of the foil for shaping takes place progressively towards the portions of smallest radius of curvature of the mould.

By using the present apparatus, the initial foil thickness, required to be used for a predetermined material thickness at the corners of the moulded article, only needs to be half as thick as compared with conventional methods and apparatus.

BRIEF DESCRIPTION OF THE DRAWINGS

The invention will be further described with reference to the accompanying drawings, in which:

FIG. 4 is a modified embodiment of the apparatus shown in cross-section.

DETAILED DESCRIPTION OF A PREFERRED EMBODIMENT

Figure 1:
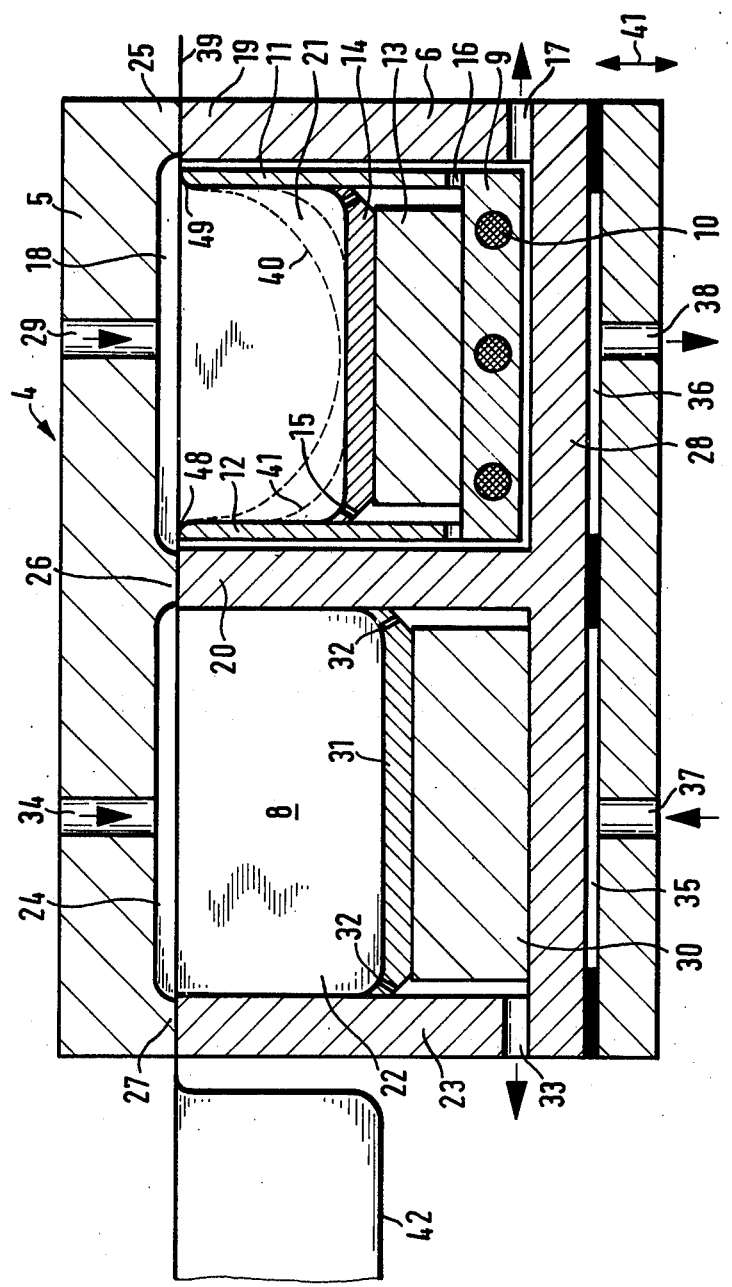
FIG. 1 shows a longitudinal section of a deep drawing apparatus embodying the present invention.

FIG. 1 shows a longitudinal section through a deep drawing apparatus having an upper portion 5 and a lower portion 6. In the lower portion 6 there is provided a first rectangular chamber 7 defined by walls 19, 20, 22, 23 and the bottom 28 and an adjacent second chamber 8 defined by the bottom 28 and side walls 20, 22, 23. The upper portion 5 is provided with recesses 18, 24 opposite the chambers 7 and 8, the edges 25, 25, 27 of such recesses co-operating with the walls 19, 20, 22, 23 of the first and the second chambers in such a way that the chambers are hermetically closed.

In the first chamber 7 there is provided a bottom portion 9 with heating elements 10 with portion 9 being supported in the lower portion 6 but thermally insulated therefrom. Furthermore, portion 9 is also connected with side walls 11, 12, 21 which are of good heat-conducting material. A filling piece 13 of good heat conductivity is inserted on the bottom portion 9, the filling piece 13 determining the required height of the space for the deep drawing. Above filling piece 13 a matrix 14 is arranged which is also of good heat conductivity and which on its side facing the upper portion 5 has the configuration of the shape to be deep-drawn. Heating elements 10 thus heat all of the side walls 11, 12, 21; and the matrix 14 forming a bottom surface with a predetermined temperature.

The space enclosed by the side walls 11, 12, 21; and the matrix 14 is communicable with a vacuum source or vacuum pump via a plurality of small bores 15 in matrix 14, and a plurality of bores 16 in the side walls 11, 12. Bores 16 are connected via a bore 17 in wall 19 to a conduit which is not shown. Additionally, there is provided a bore 29 in the upper portion 5 forming a cover of the chamber 7, which is connectable with a source of pressurized air, not shown.

While the second chamber 8 is not provided with a heating element, the bottom 28 includes a filling piece 30, above which is positioned a matrix 31 corresponding to matrix 14. The filling piece 30 is selected in such a way that a desired bottom level is created in the space remaining above matrix 31. As with the matrix 14, the matrix 31 has a plurality of bores 32 at its corners or edges through which the space formed by the side walls 20, 22, 23, through a further bore 33 in the side wall 23, is communicable with a vacuum pump, not shown. In the zone of upper cover portion 5, there is provided a bore 34 which is connectable with a source of pressurized air through a conventional conduit which is not shown.

The side walls 19, 20 and the bottom 28 are insulated with respect to heat conduction from the heatable parts in the first chamber. Flow chambers 35, 36 are provided on the bottom 28 which is connected with a refrigerant inlet conduit through a bore 37 and with a refrigerant outlet conduit through a bore 38, whereby the walls of the lower portion and the walls of the second chamber 8 may be cooled via the bottom 28. At the same time the matrix 31 is also cooled via its connection with the side walls 20, 22, 23 and via the connection of filling piece 30 with the bottom 28.

The shaping of the plastics foil takes place in the following manner: Unshaped foil 39 is clamped between the edge of the walls surrounding the first chamber 7 and the corresponding edge surrounding the recess 18. With the foil still at a temperature below its deformation temperature suction is applied to the lower surface of foil 39 through bores 17, 16, and 15 via a conventional vacuum pump, drawing foil 39 into the chamber 7. Foil 39 initially assumes a shape indicated by the dotted line 40. Thus as, the previously unheated foil 39 contacts the upper portions of pre-heated side walls 11, 12, 21 it is there heated there to a temperature which is appropriate for shaping or stretching. The foil 39 stretches somewhat because of the suction acting on it. Those zones of the foil 39 adjacent its heated zone are brought into contact with heated side walls 11, 12 and 21, whereby these adjacent zones are heated to the shaping temperature and become extended or stretched as a result. Finally, the foil 39 also contacts the heated matrix 14 and takes the shape indicated by the dotted line 41. The bottom surfaces of foil 39 are heated, and stretch in this zone. Because the bores 15 are arranged at the corners and edges of matrix 14, i.e. at the portions of smallest radius of curvature, the foil 39 is sucked into the corners. The foil 39 is thus progressively heated from the walls and from the bottom in the direction towards the corner or edge and is stretched into conformity with the mould cavity. Only at the last moment does the foil 39 contact the edge and corner zones of the matrix 14 itself and is momentarily heated for moulding into its desired shape. Obviously, the foil material in the corners and edges is only stretched to a minor extent so that in any event the wall thickness in the corners and edges is not less than in the remaining wall zones.

After this first operating step, the vacuum pump is shut off and the lower portion 6 of the deep drawing apparatus is lowered in the direction of arrow 60. The lowering of the lower portion 6 is performed in the usual manner to such an extent that the deep-drawn shaped product may be freely moved to the second chamber 8. The lower portion 6 is then raised in the direction of the arrow 60 and pushed against the upper portion 5.

By means of bores 32 and 33 and a conventional vacuum pump connected therewith, suction is applied from below to the shaped and heated foil in such a way that the foil contacts the cold walls and the bottom of the second chamber 8. The foil is thereby cooled down and is thus stabilized. At the same time, the above described shaping process is being repeated in the first mould chamber 7 with a subsequent portion of the foil 39. The vacuum pump connected with the bores 33 and 17 is then again shut off, the lower portion 6 is lowered and the foil is moved further towards the left-hand side in the arrangement shown in FIG. 1 out of the deep drawing apparatus having assumed the stable shape 42 mentioned before.

The mould cavity of the first chamber 7 defined by the matrix 14 and the side walls 11, 12, 21 and the mould cavity in the chamber 8 defined by the side walls 20, 22, 23 and the matrix 31 may have the same size, i.e. the final size of the desired deep-drawn shape. However, in order to avoid wrinkles forming in the deep-drawn foil, the size of the first mould cavity formed by the heated walls and the matrix 14 may be formed somewhat smaller than the size of the mould cavity in the second chamber 8. Preferably, the dimensions of the mould cavity in the first chamber 7 are approximately from one to five per cent smaller than the dimensions of the mould cavity in the second chamber 8. In any event, the dimensions of the mould cavity in the second chamber 8 correspond with those of the final desired deep-drawn mould.

It is possible to bring the foil into contact with the walls in the first and/or second chamber by using pressurized air from above as well as by suction from below. In this case, pressurized air is injected through the openings 29 or 34. If desired, suction can be applied below the foil and simultaneously compressed air can be admitted through the openings 29, 34, the compressed air uniformly acting on the foil through the recesses 18, 24.

In a modified embodiment the second chamber 8 is omitted. In this case, the method is performed by omitting the cooling step performed in this chamber; instead the moulded article is cooled down outside the apparatus e.g. by the ambient air. In this case, the size of the mould cavity of the first chamber is selected to be the same as the desired dimensions of the moulded article.

Figure 3:
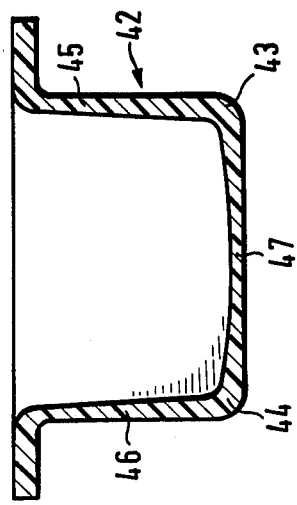
FIG. 3 is a sectional view of a packaging tray produced by a method and apparatus in accordance with the present invention.
Figure 2:
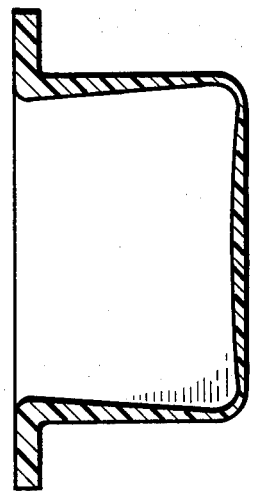
FIG. 2 is a sectional view of a packaging tray formed by a prior art method and apparatus.

FIG. 3 shows a sectional view through a deep-drawn moulding 42 made by the above described method. It is apparent that the corners and edges 43, 44, unlike those of the conventionally formed moulding of FIG. 2, are even thicker than the side walls 45, 46 and the bottom 47 of the deep-drawn foil moulding, in the embodiment shown. In order to avoid damaging of the foil on the edge of the deep-drawing mould, the edges 48, 49 of the side walls forming the mould cavity of the first chamber 7 are rounded as shown in FIG. 1 so that no edges may weaken or damage the foil during the deep-drawing process.

In a further, non illustrated embodiment, the apparatus is arranged in such a way that the first heated chamber and the second, unheated chamber are not arranged side by side as shown in FIG. 1 but instead the first, heated chamber is arranged in a correspondingly formed upper portion opposite the second chamber in the lower portion. In a first operating step, without being preheated, the foil is caused to enter the mould in the first chamber by compressed air or by suction in the same way as in the above disclosed embodiment. In a second operating step the foil is then inserted into the second, unheated chamber by an oppositely acting positive or negative pressure and is there finally stabilized by being cooled. However, this modification does have certain drawbacks. In the case of composite foils, e.g. a polyethylene/polyamide composite, the polyethylene layer of the foil is heated during pulling up into the first, upper chamber. As the polyethylene layer has a lower melting point than the polyamide layer, bonding can easily occur. Further, with this method the foil must remain at the same place during two operating steps so that it can be advanced only every second operating step. With the arrangement shown in FIG. 1 and the method disclosed in connection therewith the operating speed is thus twice the speed with chambers arranged one above the other.

With the embodiment shown in FIG. 1, it is very easy to adapt the deep drawing apparatus to any desired shape and size with only a few manipulations by replacing the matrices 14, 31 and if necessary the filling pieces 30, by simply taking them out and inserting new ones. On the contrary, where the two chambers are arranged one above anoher, the upper chamber, which opens downwardly must be provided with a mounting means for inserting and exchanging the filling pieces and the matrices.

The temperatures of the side walls and the matrix in the first chamber used with the method, the pressure differences applied to the foil and the dwell time in the first and second chambers depend on the foil material and are selected as a function of the material used. The deep drawing apparatus shown in FIG. 1 is part of a vacuum packaging machine. However, the method may also be used with other packaging machines.

Where a foil which is difficult to shape is used, e.g. a very thick foil, the foil may be pre-heated to a moderate temperature below the deformation temperature. To this end, in the device shown in FIG. 1, a heat radiating plate may be provided in the upper portion 5.

FIG. 1 shows an embodiment wherein the foil 39 is to be formed into a downwardly deep-drawn mould. However, with the same principle it is also possible by mere inversion of the arrangement to produce upwardly deep-drawn moulds.

The bores 15, 32 provided in the moulds of the first and second chambers are respectively arranged in the corners and edges of the above disclosed embodiment. With more complicated geometrical shapes, as usual with deep drawing apparatuses, such bores are provided at all those locations of the mould or matrix which are the last to be contacted by the foil during the deep drawing, and further at all recesses and bulges of a mould. When the foil is shaped by suction it is pulled through these bores into the corners and recesses. In case the deep drawing is performed by positive air pressure through the bores 29, 34, these bores 15, 32 are used to let air escape between the matrix and the foil so that no air cushions can form.

The alternative embodiment shown in FIG. 4 is generally similar to that of FIG. 1, and so the following will be largely directed to the differences. The lower portion 6 is left unchanged with respect to the embodiment of FIG. 1. Only the upper portion is modified to be provided with a heating plate 52 in the recess 51 of the first chamber 7, such heating plate being rigidly fixed to the upper portion 50, e.g. by means of fastening means 53. On its lower face the heating plate is provided with a layer 55 of polytetrafluoroethylene or Teflon to avoid bonding with the heated foil 39. The heating plate 52 is arranged in such a way that the Teflon layer will be spaced from the foil by approximately 2 mm. Bores 56, 57 are provided in the heating plate which are connected with a vacuum source. Through these bores the foil 39 will be attracted by suction to the Teflon layer in order to be heated. Heating of the heating plate is provided by heating elements 54.

With the above device the disclosed method is performed in such a way that the foil 39 to be deep-drawn is initially pre-heated in a first step by heating plate 52. The foil thus achieves a temperature above room temperature, but considerably below its deformation temperature. Dpending on the material, the temperature may be selected to be within the range extending from substantially 30° C. to substantially 80° C. Best results were obtained with pre-heating to a temperature between 30° C. and 40° C.

The device shown in FIG. 4 may alternatively be modified in such a way that the foil is not attracted to the heating plate, but the pre-heating of the foil is provided by radiating heat.

I claim:
1. Deep drawing moulding apparatus for shaping thermoplastic foil-type material into a container comprising:
   a mould assembly including a hollow chamber portion formed therein,
   a mould cavity within said chamber defining an inner surface including a bottom portion, at least one sidewall portion, and a junction portion which joins said bottom portion to said sidewall portion;
   heat source means for heating said mould cavity to a temperature which is at a level over substantially the entire said inner surface portion that is at least as high as the deformation temperature of said foil-type material, said heat source means comprising the only source of heat for said foil-type material which is heated to a temperature at least as high as said deformation temperature;
   means for positioning at the opening of said mould cavity a portion of said thermoplastic material at a temperature below its deformation temperature,
   means extending through said junction portion for providing suction to progressively draw said foil into contact with said sidewall portion and also with said bottom portion before contacting said junction portion to provide continuous progressive heating and deformation of said foil-type material as said material progressively contacts the inner surface of said mould cavity.

2. An apparatus according to claim 1, with said mould assembly further comprising:
   a further hollow chamber positioned at a downstream workstation relative to said hollow chamber portion,
   a further mould cavity within said further chamber defining an inner surface including a bottom portion, at least one sidewall portion, and a junction portion which joins said bottom portion to said sidewall portion,
   said further mould cavity being substantially similar in shape to said mould cavity.

3. An apparatus according to claim 2, wherein said inner surface of said further mould cavity is larger than said inner surface of said mould cavity corresponding to the final desired shape of said container.

4. An apparatus according to claim 2, wherein said further mould assembly includes means extending through said junction portion for providing suction to draw said foil into contact with said sidewall portion and said bottom portion of said further mould cavity.

5. An apparatus according to claim 16, wherein said hollow chamber and said further hollow chamber are positioned side by side.

6. An apparatus according to claim 1, wherein said moulding apparatus further comprises pre-heat means for heating unstretched thermoplastic foil-type material positioned at the opening of said mould cavity to a temperature level greater than room temperature and less than the deformation temperature of said foil.

7. An apparatus according to claim 6, wherein said pre-heat means comprises:
- a heating plate extending substantially parallel to and spaced from said foil-type material,
- a plurality of bores extending through said heating plate for providing suction to draw said foil-type material into contact with said heating plate; and
- heat source means for heating said heating plate to a temperature level above room temperature and below the deformation temperature of said foil-type material.

8. An apparatus according to claim 7, wherein said heating plate includes a surface layer of polytetrafluoroethylene facing said foil-type material to prevent bonding therebetween.

9. Apparatus according to claim 1, wherein said clamping means comprises first and second mould members removably positionable in contact with said foil and on opposite sides thereof.

10. Apparatus according to claim 1, wherein said heat source means comprises a heater positioned in heat transfer contact with said wall portion, with a heat conducting filling member positioned between said heat source and said bottom portion of said mould cavity.

11. Apparatus according to claim 1, wherein said means comprises a plurality of bores extending through said mould cavity and into fluid communication with a vacuum source.

* * * * *

UNITED STATES PATENT AND TRADEMARK OFFICE
CERTIFICATE OF CORRECTION

PATENT NO. : 4,162,884
DATED : July 31, 1979
INVENTOR(S) : Arthur Vetter

It is certified that error appears in the above-identified patent and that said Letters Patent are hereby corrected as shown below:

Foreign Application Priority Data

Dec. 10, 1976 [DE] Fed. Rep. of Germany......7638759

Signed and Sealed this

Twenty-third Day of October 1979

[SEAL]

Attest:

RUTH C. MASON
Attesting Officer

LUTRELLE F. PARKER
Acting Commissioner of Patents and Trademarks